US006868340B2

(12) United States Patent
Alexander et al.

(10) Patent No.: US 6,868,340 B2
(45) Date of Patent: Mar. 15, 2005

(54) EMERGENCY MANAGEMENT SYSTEM

(76) Inventors: John Franklin Alexander, 4236 NW 58th Way, Gainesville, FL (US) 32606; Gerald Merckel, 4390 Tradewinds Dr., Jacksonville, FL (US) 32250; J. David Lambert, 1823 Selva Grande Dr., Atlantic Beach, FL (US) 32233

( * ) Notice: Subject to any disclaimer, the term of this patent is extended or adjusted under 35 U.S.C. 154(b) by 121 days.

(21) Appl. No.: 10/409,305

(22) Filed: Apr. 8, 2003

(65) Prior Publication Data

US 2003/0212494 A1 Nov. 13, 2003

Related U.S. Application Data

(63) Continuation of application No. 09/822,931, filed on Mar. 30, 2001, now Pat. No. 6,574,561.

(51) Int. Cl.$^{7}$ .................................................. G01V 3/38
(52) U.S. Cl. .......................................... 702/5; 711/100
(58) Field of Search ............................................ 702/5

(56) References Cited

U.S. PATENT DOCUMENTS

| | | | | |
|---|---|---|---|---|
| 4,956,875 A | | 9/1990 | Bernard et al. | |
| 5,278,539 A | | 1/1994 | Lauterbach et al. | |
| 5,628,050 A | | 5/1997 | McGraw et al. | |
| 5,815,417 A | | 9/1998 | Orr et al. | |
| 6,002,748 A | | 12/1999 | Leichner | |
| 6,028,514 A | | 2/2000 | Lemelson et al. | |
| 6,084,510 A | | 7/2000 | Lemelson et al. | |
| 6,151,611 A | * | 11/2000 | Siegel | 715/541 |
| 6,550,674 B1 | * | 4/2003 | Neumark | 235/383 |
| 6,574,561 B2 | | 6/2003 | Alexander et al. | |
| 6,600,914 B2 | * | 7/2003 | Uhlik et al. | 455/512 |
| 2002/0069312 A1 | | 6/2002 | Jones | |
| 2002/0077953 A1 | * | 6/2002 | Dutta | 705/37 |
| 2003/0090735 A1 | * | 5/2003 | Silverbrook et al. | 358/402 |

* cited by examiner

*Primary Examiner*—Marc S. Hoff
*Assistant Examiner*—Anthony Gutierrez
(74) *Attorney, Agent, or Firm*—Thomas C. Saitta

(57) ABSTRACT

A system for automating the gathering of field information that describes the condition of specific geographical locations at specific times via a field information recording device having a GPS receiver for the recording and assignment of the space-time coordinates as information is gathered. The information and space-time coordinates are transmitted to a management center for processing over a communication network. Upon receipt, the field information is integrated into a geographic database such that the information generates a template showing the current state or condition of the identified geographical location on an automated basis. The template and the associated geographical portion of the geographical database are distributed to users via the Internet, intranet or other communication means.

11 Claims, 6 Drawing Sheets

Summary Reports

| Zone | Score | Power | Item | Item |
|---|---|---|---|---|
| 1 | 4.2 | 15 | 4.2 | 15 |
| 2 | 3.8 | 40 | 3.8 | 40 |
| 3 | 2.4 | 38 | 2.4 | 38 |
| 4 | 4.2 | 15 | 4.2 | 15 |
| 5 | 3.8 | 40 | 3.8 | 40 |
| 6 | 2.4 | 38 | 2.4 | 38 |
| 7 | 4.2 | 15 | 4.2 | 15 |
| 8 | 3.8 | 40 | 3.8 | 40 |
| 9 | 2.4 | 38 | 2.4 | 38 |
| 10 | 4.2 | 15 | 4.2 | 15 |
| 11 | 3.8 | 40 | 3.8 | 40 |
| 12 | 2.4 | 38 | 2.4 | 38 |
| 13 | 4.2 | 15 | 4.2 | 15 |
| 14 | 3.8 | 40 | 3.8 | 40 |
| 15 | 2.4 | 38 | 2.4 | 38 |
| 16 | 4.2 | 15 | 4.2 | 15 |
| 17 | 3.8 | 40 | 3.8 | 40 |
| 18 | 2.4 | 38 | 2.4 | 38 |
| 19 | 4.2 | 15 | 4.2 | 15 |
| 20 | 3.8 | 40 | 3.8 | 40 |
| 21 | 2.4 | 38 | 2.4 | 38 |

Interactive Map

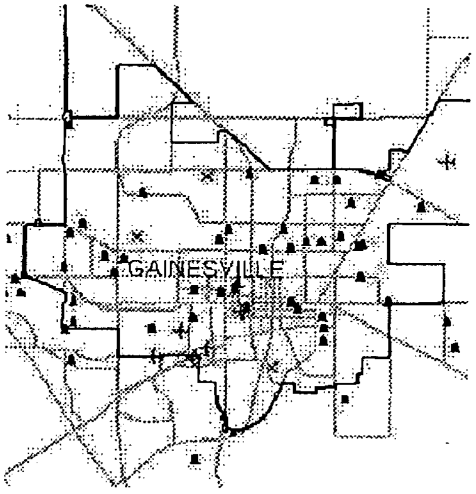

Individual Events by Time / Date

| Event_Id | Immediate | Str | Pwr | Sup | Headline | Date | Time | Item | Item |
|---|---|---|---|---|---|---|---|---|---|
| 100201 | | 5 | Y | N | VOLUNTEERS | value | value | value | value |
| 100202 | POLICE | 3 | N | F,W | LOOTING | value | value | value | value |
| 100203 | | 3 | N | W,G | SPOILAGE | value | value | value | value |
| 100204 | | 5 | Y | N | VOLUNTEERS | value | value | value | value |
| 100205 | AMBULANCE | 3 | N | F,W | LOOTING | value | value | value | value |
| 100206 | | 3 | N | W,G | SPOILAGE | value | value | value | value |
| 100207 | | 5 | Y | N | VOLUNTEERS | value | value | value | value |
| 100208 | FIRE | 3 | N | F,W | LOOTING | value | value | value | value |
| 100209 | | 3 | N | W,G | SPOILAGE | value | value | value | value |
| 100210 | | 5 | Y | N | VOLUNTEERS | value | value | value | value |
| 100211 | | 3 | N | F,W | LOOTING | value | value | value | value |
| 100212 | | 3 | N | W,G | SPOILAGE | value | value | value | value |
| 100213 | | 5 | Y | N | VOLUNTEERS | value | value | value | value |
| 100214 | | 3 | N | F,W | LOOTING | value | value | value | value |
| 100215 | | 3 | N | W,G | SPOILAGE | value | value | value | value |
| 100216 | | 5 | Y | N | VOLUNTEERS | value | value | value | value |
| 100217 | | 3 | N | F,W | LOOTING | value | value | value | value |
| 100218 | | 3 | N | W,G | SPOILAGE | value | value | value | value |
| 100219 | | 5 | Y | N | VOLUNTEERS | value | value | value | value |
| 100220 | UTILITY CO. | 3 | N | F,W | LOOTING | value | value | value | value |
| 100221 | | 3 | N | W,G | SPOILAGE | value | value | value | value |
| 100222 | | 5 | Y | N | VOLUNTEERS | value | value | value | value |
| 100223 | | 3 | N | F,W | LOOTING | value | value | value | value |
| 100224 | | 3 | N | W,G | SPOILAGE | value | value | value | value |
| 100225 | | 5 | Y | N | VOLUNTEERS | value | value | value | value |
| 100226 | | 3 | N | F,W | LOOTING | value | value | value | value |
| 100227 | | 3 | N | W,G | SPOILAGE | value | value | value | value |
| 100228 | | 5 | N | F,W | LOOTING | value | value | value | value |
| 100229 | | 3 | N | W,G | SPOILAGE | value | value | value | value |
| 100230 | | 3 | Y | N | VOLUNTEERS | value | value | value | value |
| [illegible] | | 5 | N | F,W | LOOTING | value | value | value | value |

User Interface Event Monitoring

FIGURE 3

EMERGENCY MANAGEMENT SYSTEM

This application is a continuation of and claims priority from U.S. patent application Ser. No. 09/822,931, filed Mar. 30, 2001, now U.S. Pat. No. 6,574,561, issued Jun. 3, 2003, and the contents of which are incorporated by this reference.

BACKGROUND OF THE INVENTION

In emergency management, as in other time sensitive activities, timely and accurate information is vital for use in allocating resources as well as achieving other emergency management priorities such as field assessment and analysis. Clearly, in the hours immediately following a disaster there is an urgent need for accurate information to manage the relief effort. As used herein, a disaster includes natural disasters such as hurricanes, fires, earthquakes or famine or man-made disasters such as war or terrorism. When such disasters occur, the scope of the damage is generally geographically dispersed and may affect vast numbers of people and extensive damage to infrastructure. In the time period immediately following the disaster, local resources such as police, fire protection and heath care are often inadequate to respond to all of the problems related to the disaster. Often, outside resources are required to supplement local resources and, since the disaster may be geographically widespread, it is often difficult to determine how best to allocate these outside resources.

When a disaster occurs, it is common practice to establish an Emergency Management Center (EMC) in the area hit by the disaster to collect information regarding the damage and manage the allocation of outside resources. When the disaster is widespread, such as occurs after a hurricane or earthquake, several EMCs are established throughout the region so coordinating the aid requests and efficiently allocating resources becomes a major and complicated task. These EMCs must communicate with established EMCs operated by local, state and federal agencies tasked to deal with such disasters. In addition to the EMC, individuals affected by the disaster may need to acquire information regarding their relatives or personal possessions such as a house or boat located in the disaster area.

Often, however any information that arrives at the EMC is anecdotal, resulting in improper allocation of scarce resources. Indeed, after a major disaster a period of days may pass before a clear picture of the extent and level of damage begins to form at the EMC. In the meantime crucial decisions on resource allocation are made with only limited information. During the time period immediately following the disaster, individuals may clog the telephone network and harass officials at the EMC and elsewhere for information relating to their personal concerns. There is a great need to provide timely and accurate information to individuals in an automatic manner so that EMC officials are free to concentrate on coordinating disaster relief.

Unfortunately, the EMC that often sends in the first resource requests is the area least affected by disaster while EMCs located in geographical areas with heavy damage are typically overwhelmed and slow to assess the damage, as the emergency response personnel are occupied responding to immediate lifesaving tasks. Many times EMCs in heavily damaged areas are simply unable to determine what resources are required. Often the damage to the infrastructure, such as by way of example, highways, power transmission grids, water supply, condition of medical facilities, public buildings, etc., is so heavily damaged that it is difficult to even establish communication between EMCs to request assistance. Without accurate and timely information, there is a high risk of improperly allocating scarce resources.

When a large hurricane makes landfall, by way of illustrative example, up to forty-eight hours may pass before areas hard hit by the storm are able to re-establish communications. During this period there may be little accurate information available to the EMC as to the extent of the damage, or the exact resources that are required. Because of this information void at the central EMC during the period immediately following the disaster, it is difficult to provide adequate resources in a timely manner. To overcome the information void, Federal Emergency Management Association (FEMA) agents use portable information and communication devices, such as the GSC100 manufactured by Magellan, Inc., to relay information from established emergency locations to the EMC. This vital information, sent via a satellite communication system, includes the functional status of hospitals, the extent of property damage, the state of communications networks, and the condition of other infrastructure in the area affected by the disaster. Thus, the remote emergency centers are able to immediately begin collecting damage information through observation. The agents are able to observe downed bridges, blocked roads, destroyed buildings and numerous other items vital to accurate field assessment and analysis. Use of the information provided from the remote emergency centers is collected and manually tabulated to develop a more timely picture of damage caused in the disaster. Unfortunately, this system does not provide for real time assessment of the data at the EMC. Since decisions at the EMC must be made and resources allocated according to timely assessment of the damage, failure to accurately assess the scope and scale of the damage and allocate resources commensurate with the size of the disaster is possible. This type of failure to timely analyze the data is a fundamental problem that commonly occurs during and immediately following a disaster.

What is needed is a method and system for determining human casualties and inspecting infrastructure immediately after a disaster and for rapidly translating this information into a usable format for prompt analysis at the EMC or at other sites tasked with assisting in an emergency. A significant limitation under which the inspectors must operate arises because they only see a fragment of the disaster area and their immediate impressions may not reflect the situation as it exists in the entire area. What is needed is an emergency management system that provides reliable two-way communication capability that is separate from terrestrial-based communications networks and that is able to aggregate reports from widely dispersed locations within a geographical area in a timely manner.

It is an object of this invention to meet these needs by providing a real time management system for collecting information from geographical distributed locations comprising:

means for collecting information at geographically distribtuted locations and for assigning unique space-time coordinates associated with said information, said information and said associated space-time coordinates collected for subsequent transmission;

a communication network for transmitting said collected information and associated space-time coordinates;

means for establishing a connection between said information collection means and said communication network and for initiating the transmission of said collected information and associated space-time coordinates at a selected time; said establishing means coupled to said means collecting means;

a computer, coupled to said communications network, adapted to receive said collected information and associated space-time coordinates from said information collection means and for transforming said collected information and associated space-time coordinates into an event description and associated GIS data; said computer adapted to store said event description and associated GIS data in an event database and for accessing a reference geographic database to generate an event summary map that combines said event description with a previously generated base map; and means for distributing said event summary map.

It is a further object to provide a system for managing the distribution of resources in response to a disaster comprising:

means for assessing damage at a location and communicating information regarding the damage, said damage assessing means comprising a portable communication device having a visual display for displaying a menu-based field assessment form displayed in a manner that prompts a user to enter information responsive to a plurality of displayed queries, a data entry device for generating data responsive to each query and means for retaining said responsive data; said field assessment means further comprising means for determining the location of damage and for appending information specifying said location to said responsive data;

a management center for receiving said responsive information and said location information; said management center having at least one server for parsing said responsive information and said location information to generate reports and maps; and a communications network linking said damage assessing means and said management center for the transmission of information there between.

It is a further object to provide a method for obtaining and distributing information concerning field conditions in selected geographical areas comprising of the steps of:

acquiring field assessment information;

associating said field assessment information with space-time coordinates;

establishing a communication link for the transmission of said information and said coordinates at selected intervals;

transmitting said information and said coordinates to a management center;

parsing said information and said coordinates;

performing data analysis and data reduction to determine field conditions at said coordinates at a specified time;

creating reports summarizing field conditions at selected coordinates;

generating a map overlay that integrates said information and said coordinates with said reports;

distributing said map overlay and said reports.

It is a further object to provide a method for obtaining and distributing information regarding damage occurring over a large geographical area; said method comprising the steps of:

acquiring field assessment information;

appending longitude and latitude of the location of the damage;

establishing a communication link for transmitting field assessment information to an emergency management center; and transmitting field assessment information to said emergency management center; Parsing the field assessment information to determine extent of damage;

generating a report of said damage;

generating a map overlay showing the location of said damage; and transmitting said report and map.

SUMMARY OF THE INVENTION

The present invention provides real time field assessment data to emergency management centers (EMCs) through distributed communications networks. Significantly, the present invention collects field assessment information and generates intuitive graphical displays and summary reports to enable the prompt and accurate field assessment at the EMC. Communications directing the deployment of resources are then transmitted to a plurality of EMC and response personnel. It will be apparent to one skilled in the art that after a disaster an EMC needs good and accurate information in the hours immediately following a disaster to allocate scarce resources and to assess the scope of the damage. Accordingly, other statistical tools are provided so that an analysis of the scope and magnitude of the disaster may be timely determined. Thus, the present invention provides timely and accurate information to the EMCs and enables the prompt and efficient allocation of scarce resources.

The emergency management system and method of the present invention incorporates facility inspections of highways, power transmission grid, public and private buildings, etc. after a disaster. Inspectors collect information regarding injuries, fires, downed bridges, blocked roads, destroyed buildings and numerous other items vital to accurate field assessment and analysis. This information is collected using hand held computers, intelligent field instruments, Internet enabled cellular telephones or other similar field devices. The present system and method may operate independently of the telephone network and the cellular telephone network if these networks are damaged. Accordingly, field inspectors' reports can be transmitted to the EMC even if the land-based communication infrastructure is damaged or otherwise unavailable. Further, the present invention aggregates reports received from throughout a geographical area affected by the disaster and generates a comprehensive graphical evaluation showing the extent and location of the damage and the type of resources required to respond to the disaster.

The emergency management system and method of the present invention includes a database of baseline data and digitized maps that are maintained in a form that is readily available for use during emergencies. The baseline data may include population, available resources such as the number and location of emergency response vehicles, facilities such as refugee shelters, hospitals or schools etc., and other information that will be needed to respond to a variety of emergencies. The baseline data is preferably supplemented by additional resources from outside the geographical area affected by the disaster in real time. Thus, as outside aid arrives or becomes available, it is quickly integrated into the overall disaster relief plan and routed to the areas where it is most needed.

Field devices capable of collecting and transmitting accurate field assessment data to a central EMC or other field-based (that is, temporary) EMCs are widely distributed throughout a geographical area. These devices may be provided to local police and fire personnel or may be carried to a disaster area by military personnel or international observers such as, by way of example, the Red Cross or the Salvation Army. A 'user-friendly' graphical interface and statistical analysis tools enable the display and analysis of field assessment data in real-time.

At the EMC, the baseline data and the maps are combined with real-time field data to generate graphical indicators of the damage in a geographical and/or summary report format and the type of emergency resources required in each of the damaged geographical areas. As outside resources arrive, the EMC is able to add the type of resource to the baseline data and generate a timely deployment to selected areas. The information from the EMC showing the extent of the damage and the available resources may be transmitted to other EMCs and field personnel so that the extent of the disaster is known to all and planning for how to respond to unmet needs is enhanced.

Communication between an EMC and field devices is real-time and two-way so as to enable development and management of timely response and recovery plans. In one preferred embodiment, the ORBCOMM satellite network links the field device with the Internet or other distributed network to provide a highly reliable communication system. Information collected by the inspectors or instruments is sent via an electronic message (e-mail) over the communication system to the EMC. Graphical or other information in packet form is transmitted from the EMC to one or a plurality of the field devices carried by the inspectors out in the field. In other embodiments where the existing land-based communication network remains functional, cellular telephones or radio communications networks are used to establish an Internet connection with the EMC. With the technological convergence of cellular telephone and personal information manager (PIM) computing devices, the field device may be a cell phone or a PIM having the ability to obtain GPS positioning information, to display graphical, audio, video and alphanumerical information and to send and receive electronic messages.

Deployment and operation of the present invention depends on various external factors, such as the population density of the geographical area covered by the EMC, the sophistication of the infrastructure, the availability of trained observers within the geographical area affected by the disaster, etc. However, there are several features, as will be described below, that will be present in each system regardless of the specific external factors.

In one embodiment, inspectors are deployed into a disaster area with hand-held portable field devices and assigned the task of collecting data indicative of the extent and location of the damage. The field device enables the inspector to collect field assessment information at specific locations using task-specific menus displayed by each field device. The field device also generates the inspector's position using Global Positioning System (GPS) technology. The location information is automatically appended to the field assessment and transmitted to the EMC. Accordingly, the inspector does not need to be familiar with local landmarks or even the local language in order to determine their current location or the best route to take to the next location that needs to be inspected. Most importantly, the field device provides the capability to instantaneously transmit site-specific disaster assessment information via a reliable communications network to a plurality of EMCs. Inspectors use their field devices to identify and report injuries to the inhabitants and damage to the infrastructure in the affected area. With the present system and method, inspectors are able to rapidly input real-time field assessment for statistical analysis at the EMC. Field inspectors provide up-to-date information on injuries or potentially life-threatening conditions, the condition of roadways, bridges, buildings, health care facilities, and the extent of damage to electrical power, water and sewage services. This field assessment is organized in a menu-driven form displayed by the field device so the inspector is prompted for the necessary information in an orderly fashion. However, since disaster situations are often very fluid, it is possible that a pre-defined menu will be insufficient to accurately describe the required resources. Accordingly, the present invention provides the field inspector the option of supplementing information responsive to the menu input with a typed or voice message. Such supplemental information may also include graphical or video information.

When the EMC receives field assessment information from the inspectors, the data is processed to generate 'up-to-the-minute' graphical status reports and maps. This information is portrayed in graphical summary reports and on detailed maps, allowing the emergency managers to form a "picture" of the extent and level of the disaster.

Additionally, the graphical presentation can be readily refined to meet the requirements of specific government agencies tasked with responding to a particular type of emergency. For example, a local EMC having responsibility for a particular geographical area such as a county or parish may generate reports and maps tailored to the location and time. This information is then made accessible to the inspectors as well as to the EMC managers concerned with routing emergency relief resources from areas outside the geographical area affected by the disaster. State or regional EMCs could use the same database to generate reports and maps that contain less specific information and more statistical analysis.

Based on aggregation and analysis of information received at the EMC, inspectors can be repositioned to rapidly generate a complete picture of the geographical area affected by the disaster. Because the present system and method guarantees two-way, real-time data flow, managers at the EMC will be able to track and manage the progress of the inspectors more efficiently than has been possible before. The real time information will also be available though the Internet to authorized officials or to the public as appropriate so that reports and maps will identify the areas most affected by the disaster as well as the type of resources required to minimize further injury or damage.

Advantageously, instantaneous and precise delivery of real-time field assessments from the disaster area by trained inspectors deployed throughout the affected zone is provided in a timely manner. Updated summary reports and maps of the information available are continuously available on the Internet for use by state and local emergency managers authorized to view the real time geographical database. Greater access to information on the actual damage to the affected area improves communications between decision makers and provide better inter-governmental coordination at all levels.

DESCRIPTION OF THE DRAWINGS

FIG. 3 illustrates an interactive real-time map user interface.

DETAILED DESCRIPTION OF THE INVENTION

Figure 1:
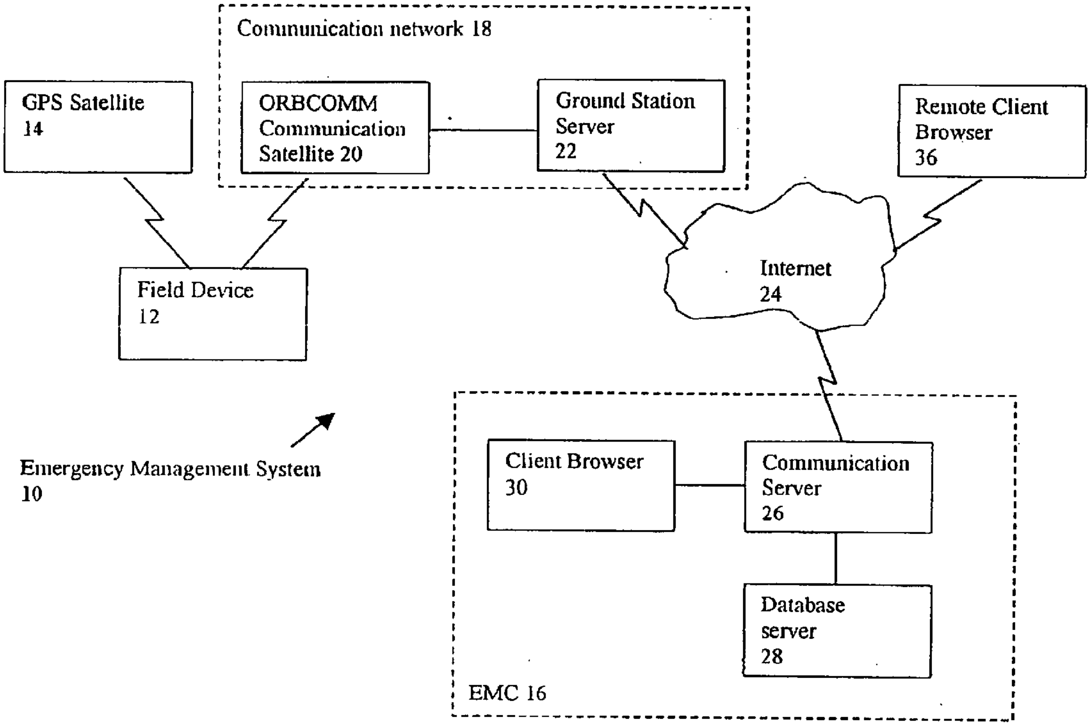
FIG. 1 illustrates an emergency management system for collecting and responding to emergencies or natural disasters.

The present invention relates to an emergency management system and method. More particularly, the present invention relates to an improved system for an efficient system and method for obtaining and assessing real-time damage and data regarding life-threatening situations from widely dispersed geographical areas. In the following description of the preferred embodiment, reference is made to the accompanying drawings that form a part hereof, and in which is shown by way of illustration a specific embodiment in which the invention may be practiced. It is to be understood that other embodiments may be utilized and that changes may be made without departing from the scope of the present invention. For purposes of illustration, the following description describes the present invention as used with particular field devices in conjunction with web-server computers and web-browser computers coupled to the Internet. However, it is contemplated that the present invention can also be used as a part of computer systems coupled to other private or public networks such as radio or telephone networks. Reference will now be made in detail to the preferred embodiments of the invention, examples of which are illustrated in the accompanying drawings. Wherever possible, the same reference numbers will be used throughout in the drawings to refer to the same or like components.

System Description

Referring now to FIG. 1, one preferred embodiment of the present emergency management system 10 is shown. System 10 includes a field device 12 capable of receiving longitude and latitude information from a global positioning satellite (GPS) 14 and transmitting this positional information and the time together with field assessment information to an emergency management center (EMC) 16 over a communication network 18.

System 10 is capable of maintaining communication even if there is widespread and extensive damage to infrastructure including land-based communication networks. When a disaster occurs, data regarding injuries and condition of the infrastructure is collected by inspectors using field devices 12. Although only one field device 12 is shown in FIG. 1, it should be understood that system 10 will typically include hundreds or even thousands of such field devices deployed throughout the geographical area affected by the disaster. Given the number of field devices, it may be necessary to provide an intermediate level for the collection of field assessment information.

Field device 12 is preferably a portable computer and communication device that includes means for establishing a connection with communication network 18 and transmitting field assessment information to EMC 16 even if the inspector or field instrument is in a remote (e.g. a rural) location. Field device 12 may be a cellular phone equipped with an Internet browser, a personal computer coupled to EMC 16 or a similar type of communication device. Field device 12 includes commercially available circuitry to obtain real-time GPS information.

Regardless of the platform utilized as field device 12, means for inputting field assessment information are required. This information input means may be, for example, either a pointing device or a microphone and display combination so that the inspector may view and select categories from a menu that graphically displays various categories from which the inspector may select. The microphone may also be used for appending voice annotations to the field assessment information. It is to be understood that the display may be any power-efficient display such as is commonly found in commercially available portable computer or cell phone devices. Alternatively, the input means includes an input device such as a keyboard or a combination of a pen and a touch-sensitive display. Once the inspector inputs the field assessment information, the GPS information is appended and transmitted to communication network 18 to the EMC 16.

In one preferred embodiment, communication network 18 comprises the ORBCOMM communication satellite system, and field device 12 is a portable computing device equipped with a satellite communication interface (not shown).

More specifically, field device 12 is a GSC 100 hand-held portable communicator, available from Magellan Inc. Alternatively, field device 12 is a portable computer such as the Palm Pilot manufactured by Palm Pilot, Inc. modified to include means for connecting to ORBCOMM satellite system. Thus equipped, field device 12 is capable of providing "anywhere-to-anywhere" communication using the ORBCOMM satellite system. The GSC 100 provides a keypad for entry of text messages and a small graphical display. The GSC 100 is capable of storing up to 100 text messages and 150 e-mail addresses and includes a wake-up feature that sends and receives e-mail messages at pre-selected time intervals. This feature is helpful if a satellite connection is not immediately available and transmissions of field assessment information must be automatically sent during specific time periods when the satellite is available. The GSC 100 also includes means for acquiring location and time information from the global positioning satellite system. An integrated GPS receiver enables the inspectors to identify the present position, plot and track the current course for continuously pointing to the destination, store way-points and provide positional information to be sent back to EMC 16. Using the GSC 100 or similar device, field device 12 is capable of establishing a reliable anywhere-to-anywhere communication link that is substantially immune to disruption by terrestrial-based disasters. Alternatively, field device 12 may be a cellular telephone having web-enhanced features so that the inspector may link to the Internet via the cellular telephone network.

In general, field device 12 may be any communication device capable of sending field assessment information to EMC 16 and receiving instructions or other information from EMC 16. Further, communication network 18 is not intended to be limited to the ORBCOMM communication satellite network. Rather, it should be apparent that the present system and method may be readily adapted to existing emergency communication networks such as police and fire dispatch systems, radio networks or even the wire-based telephone system (often referred to as POTS or the "plain old telephone system"). Further, it should be apparent that field device 12 may also include image capture devices such as a digital camera, a digital compass for determining direction, bar code reader or other bio-metric detectors (examples of which would include blood pressure, EKG, finger print recognition etc.) that may be necessary for a particular application.

Once the field assessment information is captured, field device 12 sends and optionally receives confirmation of receipt or other information by way of communication network 18. Communication network 18 may be a radio network or the public wired or wireless telephone network. However, since system 10 must remain functional in the event of a major disaster, the telephone network or other radio communication networks may not be available due to damage to telephone cable and/or transmission towers. For this reason, one preferred communication network consists of a satellite connection to a satellite communication network, such as the ORBCOMM Low-Earth-Orbit satellite communication system.

ORBCOMM is a commercial provider of global low-Earth orbit satellite data and messaging services. The ORBCOMM system uses low-Earth orbiting satellites instead of terrestrial fixed site relay repeaters to provide worldwide geographic coverage. With this system, two-way alphanumeric packets may be transmitted and received in a manner that is similar to two-way paging or email. The main components of the ORBCOMM system are a space segment, that is a constellation of low Earth-orbiting satellites 20, and a ground segment. As will be understood by one familiar with the ORBCOMM communication network, ground segment comprises several gateways, including a gateway control center (not shown), a gateway earth station (not shown) and a network control center (not shown). Each ground station further includes at least one server 22 that couples the ground station to the Internet 24. Advantageously, even if the disaster destroys or otherwise disrupts land-based communication networks, system 10 is able to transmit data and other information.

In one preferred embodiment, field assessment information is transmitted to the EMC 16 in the form of e-mail. By utilizing e-mail messages, field assessment information is transmitted in a format that enhances automatic and rapid parsing and data-mining at EMC 16. If the inspector is unable to transmit an e-mail message but is able to establish voice communication with EMC 16, an operator at EMC 16 may enter the information based on behalf of the inspector.

Since field device 12 includes a graphical display, the inspector may obtain from the EMC and display a form having an organized hierarchy of defined information categories. These information categories enable the inspector to rapidly enter information that will enable a clear and complete picture of the disaster to be formed at the EMC. The displayed form includes an easy-to-use, menu-driven user interface. In this manner, the inspector need not be an expert trained in field assessment since the form will provide the instructions or guidelines for assessing the current condition at a particular location.

In the event of a disaster, inspectors in the area collect damage data and input the information into field device 12. As the field information is gathered, the inspector's location is determined from a link to a global positioning system (GPS) satellite 14. Thus, even if identifying landmarks such as street signs or building address information are missing or obliterated, the field inspector's location may be readily determined and appended to the report. Inspectors will use field device 12 to identify and report damage to the infrastructure and buildings in the affected area using satellite transmission and GPS for navigation and location identification.

As the form is being filled out the field inspector's location and the time is appended to the electronic mail (e-mail) message. Thus, regardless of the conditions in the disaster area, global e-mail messaging capabilities (via ORBCOMM) enable communication to the EMC for prompt analysis and response. The capture of field assessment information is described more fully below.

Communication network 14 transmits disaster assessment information to an emergency management center (EMC) 16. Preferably, EMC 16 is established in advance of the disaster so that it has a secure source of electrical power and is readily accessible to emergency management personnel during or after the disaster. At EMC 16, the disaster assessment information transmitted through communication network 14 is received by a web-server computer 26 since, in the preferred embodiment, the disaster assessment information is transmitted as an e-mail message.

When web-server computer 26 receives the e-mail message containing disaster assessment information, the information will be processed by server 28 to generate 'up-to-the-minute' graphical status reports and maps.

Figure 2:
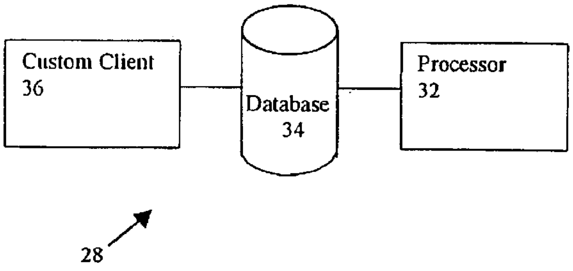
FIG. 2 illustrates the server side of the emergency management system.
Figure 4:
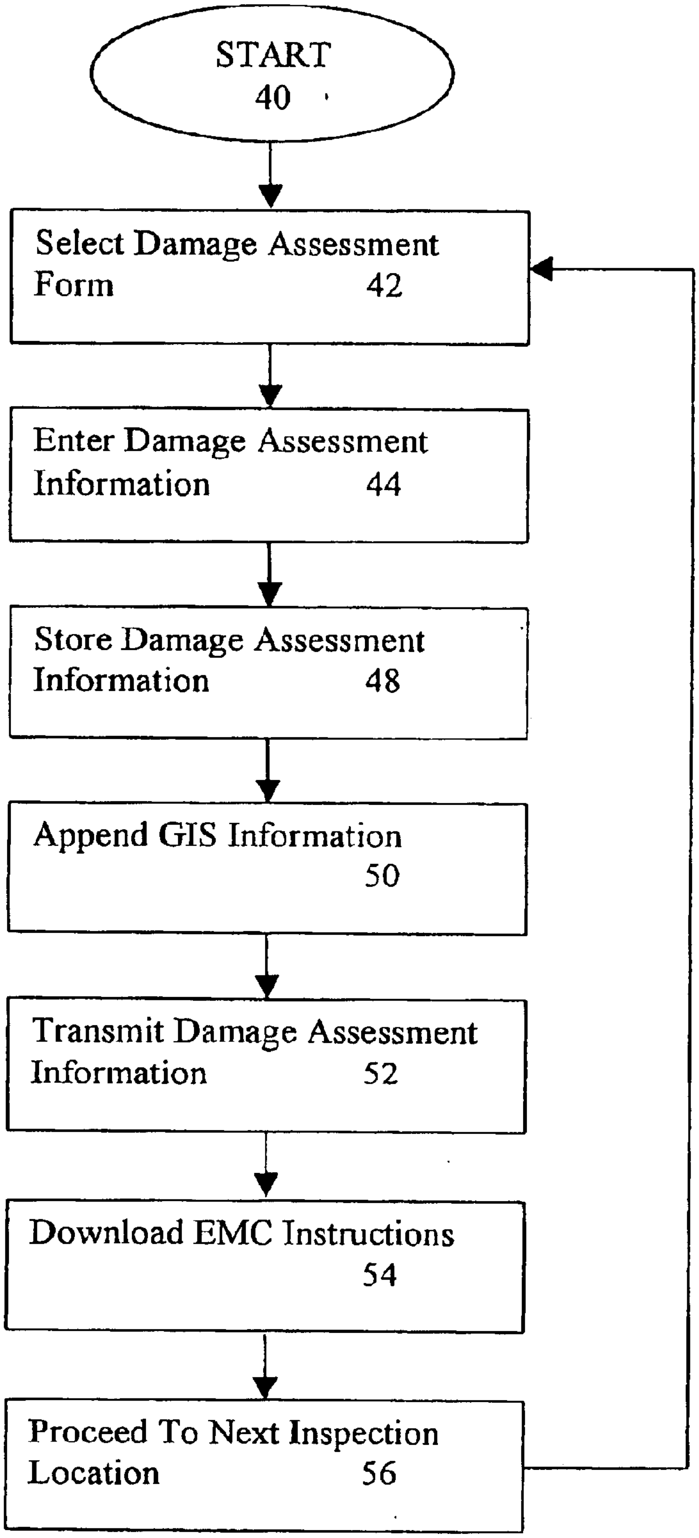
FIG. 4 illustrates a method of acquiring field assessment information.

Referring now to FIG. 2, server 28 is shown in greater detail. Specifically, server 28 includes a processor 32 coupled to communication server 26 for receiving field assessment information. One skilled in the art of data processing will recognize that server 28 may include more than one processor with each processor assigned a specific task. Alternatively, server 28 may be a single high performance processor capable of performing the communication and processing tasks.

Processor 32, in one embodiment, uses commercially available software developed by Environmental Systems Research Institute, Inc. (ESRI) called Spatial Database Engine (SDE), ArcView GIS, and ArcView Internet Map Server extension. The SDE is client/server software that enables geographic data to be stored, managed, and quickly retrieved from leading commercial database management systems like Oracle, Microsoft SQL Server, Sybase, IBM DB2, and Informix. SDE is a scalable solution, enabling geographic data to be easily integrated with non-geographic data. This software is stored on an information storage device 34 which is coupled to processor 32. Storage device 34 may be any commercially available storage device such as a large capacity RAID storage system. As is well known in the art of data storage, storage device 34 may also include distributed storage accessible by processor 32 via a network connection. As field assessment information is received via the communication network, the information may be stored on storage device 34 for later processing.

Processor 32 then accesses this information to generate detailed reports and maps using the ArcView GIS software. Processor 32 is responsible for the SDE server process, the relational database management system, and the managing the actual data culled from the e-mail reports. Processor 32 performs all spatial searches and retrieves the data locally, buffering and passing back to the client only the data that meets the search criteria. Buffering collects large amounts of data and sends the entire buffer to the client application rather than sending one record at a time. Processing and buffering data on the server is more efficient than sending the results of the spatial searches and retrieved data across the network. This feature is critical when accessing thousands or millions of records in the database.

The reports and maps generated by processor 32 are displayable on client 36. Client 36 may be any networked device such as a printer, plotter or a computer system capable of accessing database 34 to generate statistical and graphical information of interest to emergency managers. Alternatively, the reports and maps may be transmitted to the client browsers 30 and 36.

With the ArcView Internet Map Server extension, ArcView GIS enables mapping and GIS applications across the Internet. Using this software, the reports and maps are transmitted to client browsers 30 and 36 (see FIG. 1) via the Internet. Preferably, the client browsers 30 and 36 are laptop computers for use in the field, but may also be office desktop computers. The client application is the software run by the client browser 30 and 36. The client application can be an existing application, such as the commercially available ArcView, or a custom application built for a specific project. Combined with the client application is an SDE client library. The client library minimizes the bandwidth required by browsers 30 and 36 to draw the maps. The programming interface handles requests made by the client application.

FIG. 3 illustrates one possible graphical user interface that displays, in a plurality of windows, information for a selected zone. As illustrated, the display has three windows that are each separately undatable. In one window, a map of the zone is shown with a graphical overlay (icons) identifying locations where an e-mail report indicated that aid or other response is necessary. The overlay is created based on information obtained from the field assessment reports. The overlay may include additional overlays so that high priority icons can be highlighted by, for example, color or by blinking the icon. In another window, a text-based description of each e-mail report is logged and displayed in a sequential manner. In yet another window, a high-level report is displayed showing, by zone, a summary of the field assessment reports. Each window is updated as additional information is received at the EMC.

If field device 12 is "web-enabled" the inspector is also provided access to the reports and maps. If not web-enabled, e-mail messages can also be transmitted to field device 12 or other remote client browsers 28 via communication network 18. Thus, disaster managers can timely analyze the situation and send assignments via e-mail to the field inspectors. Because this system provides two-way, real-time data flow, disaster managers at the EMC 16 will be able to track and manage the progress of the inspectors more efficiently than has been possible before. This bi-directional communication between EMC 16 and inspectors dispersed throughout the geographical area affected by the disaster enables the inspectors to be quickly routed to event locations. The EMC may issue warnings and updates may be broadcast to one or more inspectors or to specific members of the disaster management team. In the preferred embodiment, the use of the ORBCOMM system removes the dependence on local communication networks to stay in touch. Sending the information over the ORBCOMM system not only promotes quick action but reduces the risk of the data being lost or erroneous. Data problems can be identified immediately so re-collection will not have to be done at a later time.

Operation of the System

With the present system and method, real time information is available to emergency management officials. The system delivers instantaneous and precise real-time field assessments of the disaster area by trained inspectors deployed throughout the affected zone. Greater access to information on actual damage in the affected area will improve communications between decision makers and provide better inter-governmental coordination at all levels. More specifically, custom maps and reports at the Web site identify geographical areas that have suffered severe damage relative to other affected areas. This information will be portrayed in graphical summary reports and on detailed maps, allowing the emergency managers to form a "picture" of the extent and level of the disaster, a vital for allocation of resources as well as for field assessment and analysis.

Each geographical area (for example, a city or a county) is divided into field assessment zones. The number of zones will vary depending on the size and composition of each geographical area that is to be covered by the information captured and stored in the database. Typically, each zone will be easily distinguishable on the ground, and will use streets and highways as borders. Each zone will be labeled as commercial, residential or rural reflecting the predominate nature of the facilities. In the initial period after the disaster, in order to allocate the resources correctly, some agency inspectors will be assigned to the commercial zones, with others assigned to check the residential and rural areas. The goal would be to ensure that, initially, teams are operating in all of the zones. The zonal method will be used both to ensure coverage and as a reporting device. For instance, as e-mail messages arrive at the disaster server, zonal summary reports will be immediately updated and made available to those individuals requiring the information. A simple summary report available for display on a client browser is shown in FIG. 3, and would be updated in real time as messages are received. Alternatively, a more sophisticated user interface such as shown in FIG. 3 allows up-to-date maps of the summary information and the status of the specific site data.

Since the reports and maps are available over the Internet, a web monitoring screen will provide a way to easily view and analyze the data. This screen will be automatically updated as each record is received from the field. Although summary information will appear on the screen, individual e-mails would be accessible for analysis. Detailed maps are generated to reveal obstacles between resources such as schools, hospitals or airports and the affected area. Field assessment models are created by overlaying areas affected with existing (i.e., permanent) information such as tax information, land use and other information. For example, spatial analysis of the incoming information can be performed against property value to determine approximate property damage. The report and maps are quickly provided to governmental agencies and the public via the Internet. Obtaining and providing information to others in a timely manner will identify and mitigate potential hazards and will assist in determining the proper recovery steps.

Figure 5:
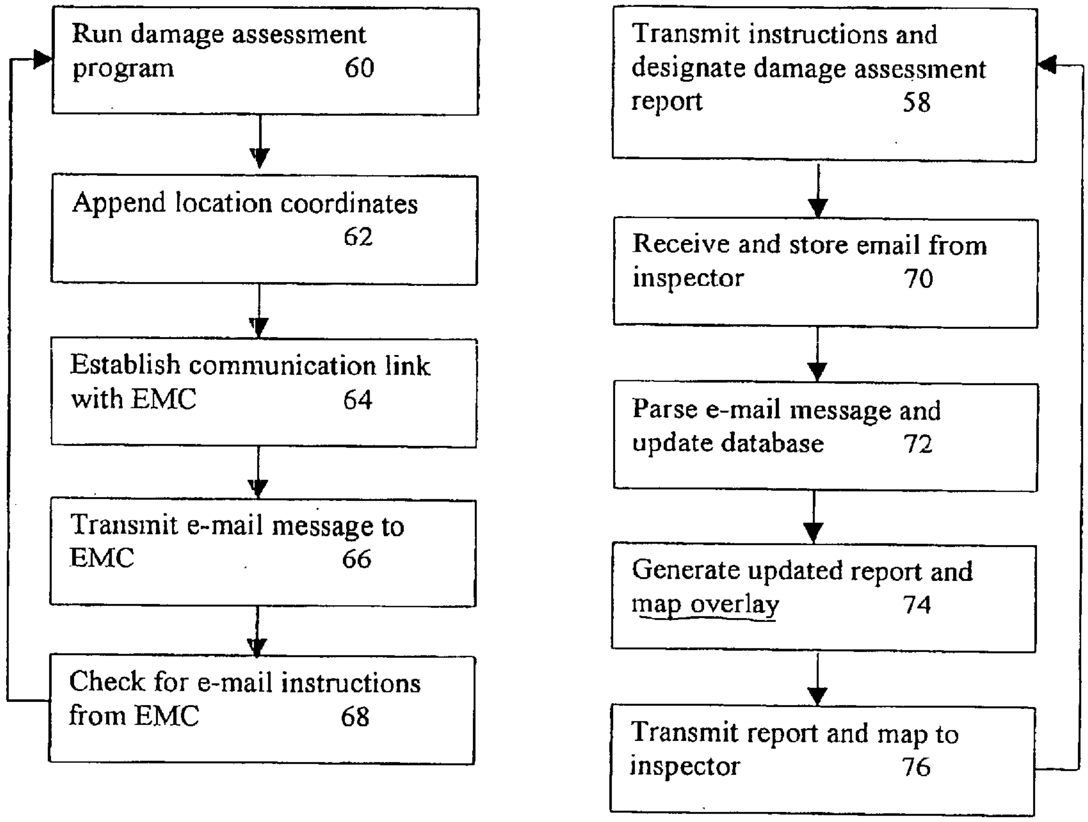
FIG. 5 illustrates the interaction between field and base components during operation of the emergency management system.

Referring now to FIG. 5, the method of acquiring field assessment information is described. Each inspector begins operation as indicated at step 40. At step 42, the appropriate field assessment form is selected so that the form's queries are displayed on the field device 12. As inspectors enter the disaster area and begin observing and recording the damage to roadways, streets, bridges, buildings, commercial areas, and the extent of electrical power, water and sewage services.

As indicated at step 44, this assessment information is entered as prompted by specific queries. As the assessment information is gathered and retained in a storage device (for example, in semiconductor memory or on magnetic media) as indicated at step 48. Field device 12, which has acquired latitude, longitude, height and time information from a GPS satellite, then appends the location and space time information to the file as indicated at step 50. Field device 12 then transmits the file as an e-mail message via the communication network, as indicated at step 52. By way of example, in the event of a natural disaster, each transmitted report includes: a structural rating from 0 (worst) to 5 (unaffected); whether a facility has power or water; and the exact latitude and longitude of the facility for use in mapping the inspection report at the EMC. Even if inspectors are initially reporting little or no damage in a particular zone, that is useful and important information. Once the initial assessment is made, resources can be reallocated into the areas that are reporting the most damage. If the communication network is not immediately available, field device 12 will transmit the e-mail message at a later time. Once the communication link is established and field assessment information transmitted, field device may download e-mail messages from the EMC as indicated at step 54. Typically, these e-mail messages provide directions to another location that must be inspected or specify that the inspector use a different field assessment form.

With the information regarding damage at the present location transmitted to the EMC, the inspector may proceed to the next inspection location, as indicated at step 56. If the inspector is able to reach the next inspection location, the entire process 40 is repeated at the new location. Inspectors will also report if there is damage to critical infrastructure en route. For example, if the inspectors come upon a tree blocking the road, the problem and the exact location of the blockage is reported by email. Emergency managers at a regional (i.e., a county or city) EMC will immediately be informed of the road closure and will be able to use this information to prioritize their efforts to open the roadways or re-route emergency vehicles. Regional EMCs will be able to use this same information to assess relative damage to the zones and determine where critical resources should be allocated first. When the information is communicated to the EMC, the EMC may then suggest alternate routes or may vector another inspector to perform the inspection.

Figure 6:
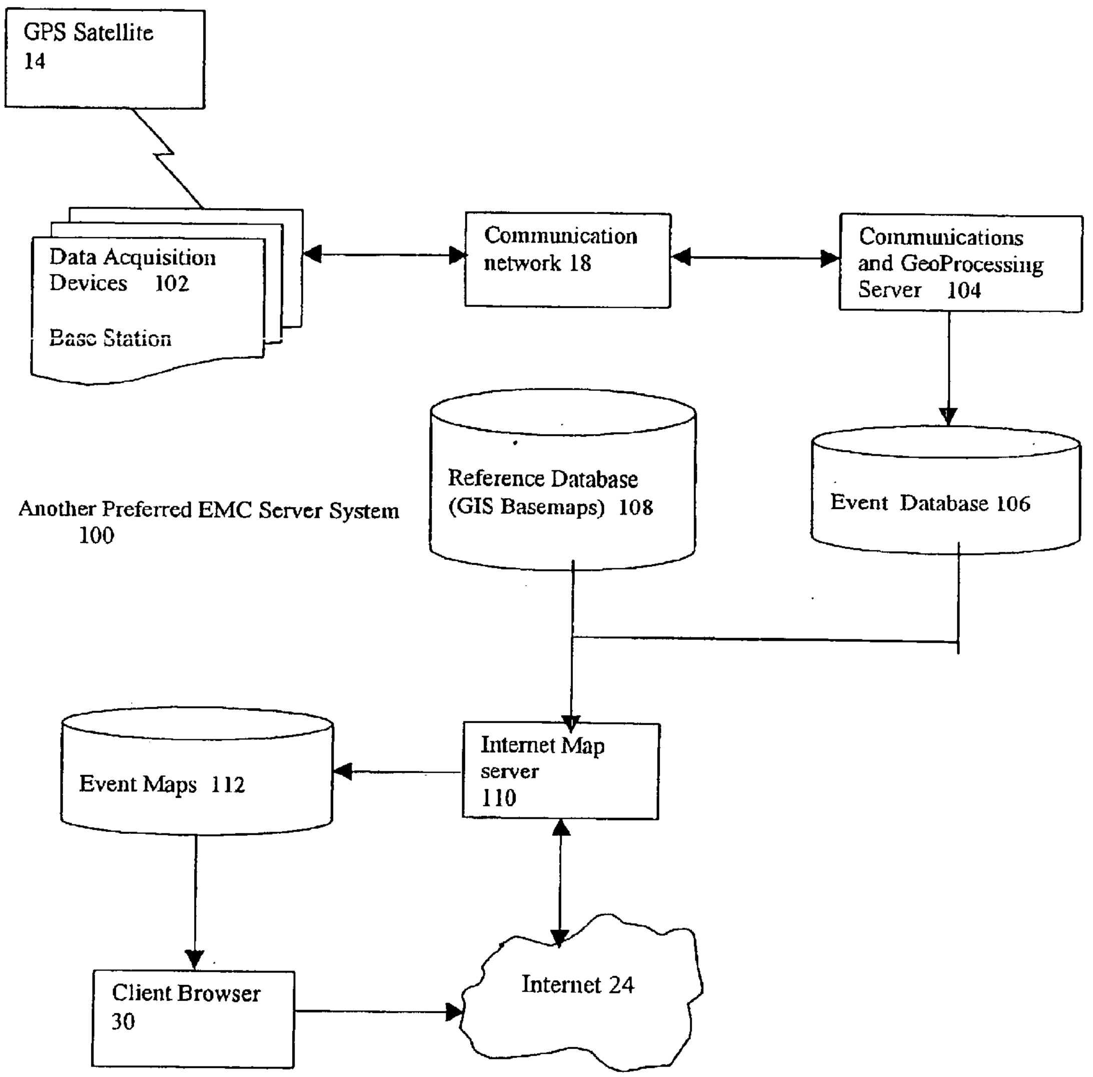
FIG. 6 illustrates another preferred embodiment of the server side of the emergency management system.

Referring now to FIG. 6, the interaction between EMC and inspectors out in the field is shown. Specifically, in one preferred embodiment, the EMC transmits instructions to the inspector, as indicated at step 58. These instructions may provide, for example, warnings, locations that need to be inspected, the availability of resources etc. The instructions may also include the assessment form that the EMC believes is most appropriate for the particular emergency.

At step 60, inspectors activate the field assessment program when they arrive at a location of interest. In the preferred embodiment, inspectors enter the field assessment information using a menu driven program resident on field device 12. The menu prompts the inspector for various categories of information such as is shown in Appendix 1. This menu enables a complete assessment as the inspector travels from inspection site to inspection site. Since the amount of information that must be collected to complete this assessment is extensive, a shorter, more specific assessment form may be necessary during the initial period immediate preceding the disaster. An example of such an assessment form is shown in Appendix 2. It is to be understood that these assessment forms are representative of the type of forms that will be displayed by the assessment program and is not intended to be limited to these specific assessment forms.

After the assessment of the damage is complete, the location coordinates are appended, as indicated at step 62. At step 64, a communication link, such as the ORBCOM communication satellite, is established with the EMC. At step 66, the field assessment and location is transmitted to the EMC as an e-mail. Process flow then returns to step 60 after checking for any additional messages from the EMC at step 68.

At the EMC, the e-mail is received from the inspector at step 70. The e-mail is initially stored on an e-mail server capable of receiving multiple e-mails simultaneously. Processing of the e-mail occurs at step 72 with the information being stored in a relational database. Using the database, reports and map overlays are generated at step 74 and transmitted to the inspectors and other interested managers over the communications network. Subsequently, EMC managers may determine that additional instructions need to be transmitted to one or more inspectors, in which case, the process returns to step 58. Otherwise, processing returns to step 70 to receive the next e-mail.

Alternative Embodiments and Organization

Figure 7:
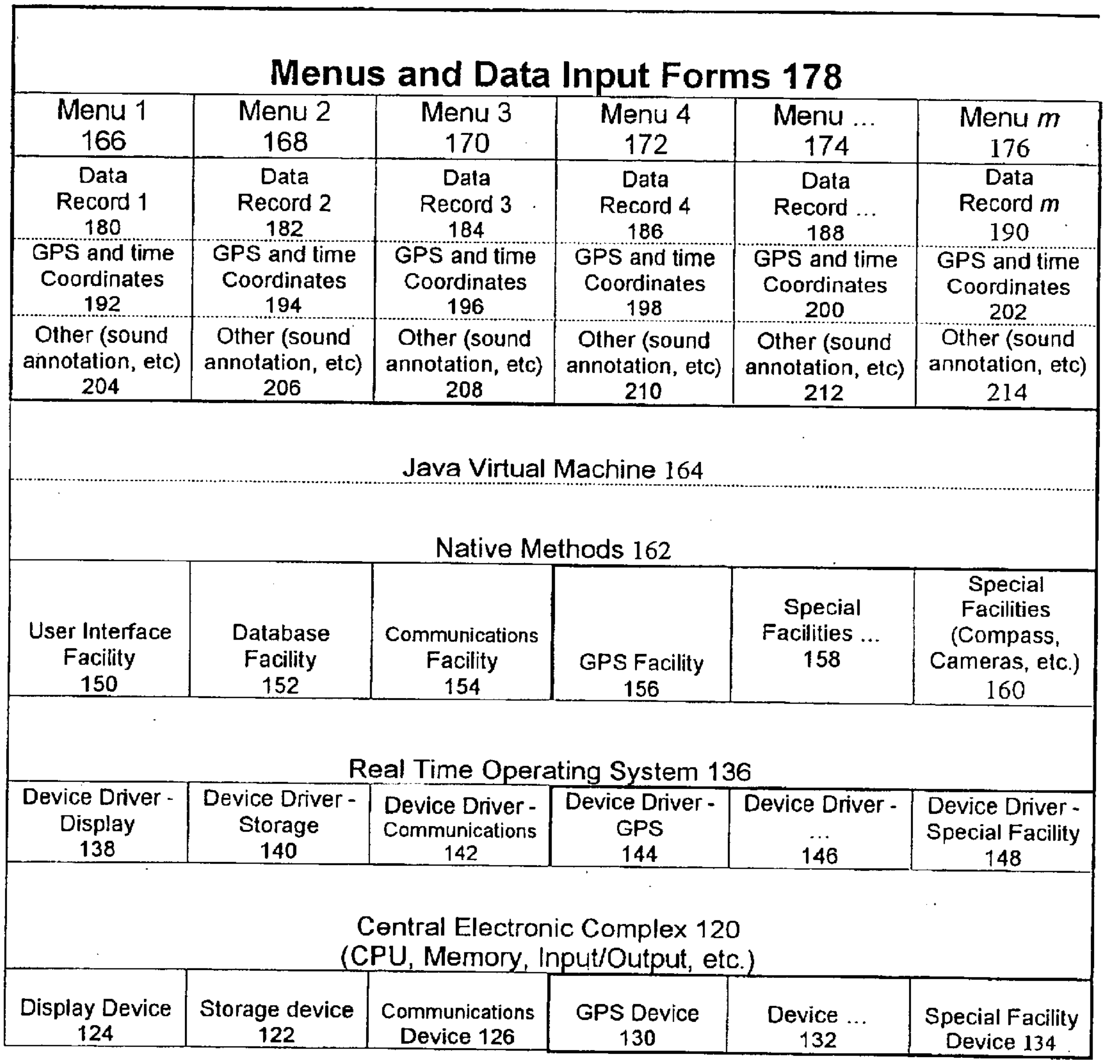
FIG. 7 illustrates one preferred embodiment of the configuration of a field device for use in the emergency management system.

FIG. 7 illustrates another preferred EMC server system 100. In this embodiment, field data collection devices may include a base station 102. At base station 102, field inspectors or other observers may arrive with reports of damage that may be entered. This antidotal information may then be supplemented by actual inspections by inspectors equipped with field devices 12 so that an accurate assessment of the damage and the location may be obtained. Clearly, base station 102 enables the receipt of information that can help in determining where the field inspectors will be next sent but this information will generally be of less value than an actual inspection due to the lack of location and time coordinates.

After collection of field data together with the location and time coordinates, field device 12 and base station 102 establish connection with a communication network 18. Communication network 18 may include telephone, wireless or satellite communication network. Communication network 18 couples field devices 12 and base station 102 to a communication and geo-processing server 104. Field device 12 and base station 102 generally provide the field data with location and time coordinates via an email or other data file in a format that is readily parsed. Server 104 parses this information to recover the event or damage information, location and time (collectively the event information). Once recovered, the event information is transferred to an event database 106 that is network accessible.

The information in event database 106 together with a reference database 108 are accessed by an Internet map server 110. Internet map server 110 uses the event information obtained from event database 106 to annotate GIS base maps obtained from reference database 108. Server 110 then stores the annotated GIS base maps in an event map database 112. Server 114 accesses database 112 to generate event summary maps and summary charts that are made available to the general public by way of a publicly accessible web site or to officials by way of a private web site with controlled access. Accordingly, server 114 further includes an Internet connection so that users may access information from event map database 112 via the Internet 116 or other network connection. In one preferred embodiment, summary maps are provided to the general public who establish a network connection with server 113 while interactive maps and communications links are established through the private web site. Interactive event summary maps and charts are thereby provided to enable prompt analysis and communication of decisions to the field inspectors or to other government officials.

As noted above, the EMC stores field assessment information in a relational database so that the information is available for extraction for custom reports and maps. A query feature provides an interface to retrieve specific records. The query results are displayed in a table and as a map. This feature allows EMC managers to quickly sort through large amounts of information to find their items of interest. Another feature integrated into field device 12 provides the inspectors a query capability to query the database for specific information. For example, an activity report for past period of time, by zone, detailing summaries of disaster assessment reports; list specified number and location of buildings or infrastructure that need to be inspected; and obtain travel directions to the next inspection location from the inspector's current location. It should be understood that the query is not limited to the above but rather is dependent on the scope of the information collected in various specific applications.

With the sophistication of the proposed system, the graphical presentation can be readily refined to meet the requirements of specific government agencies tasked with responding to a particular type of emergency. For example, health inspectors may enter inspection reports as restaurants are inspected. This information could then be made publicly available. Similarly, if the electrical service is lost in a particular area, inspectors could be quickly vectored to restaurants in the affected areas to ensure that food is properly preserved or destroyed.

A web monitoring screen will provide a way to easily view and analyze the data. This screen will be automatically updated for each record that is received from the field. The record can be selected to view on the map or to obtain additional information about the record. Summary information will also appear on the screen. A summary record can be selected for mapping or additional information. Additional reports and maps will be available via other web pages for the same emergency. Additional mapping would reveal any obstacles between resources such as schools, hospitals or airports and the damaged area. Field assessment models can be created by overlaying areas affected with existing conditions such as tax information, land use and other information. Affected areas maps could be easily generated for specific items such as power outage. The information can quickly be provided to other agencies and the public. Obtaining and providing information to others in a timely manner would mitigate potential hazards and assist in determining the proper recovery steps.

Referring now to FIG. 8, one representative field device 12 is illustrated. This structural configuration may be readily replicated on hand held portable computers such as a Palm Pilot, a web-enabled cell phone or even a notebook computer in the case of a base station. Regardless of the platform, field device 12 includes a central electronic complex 120 consisting of a processing unit, memory and various input/output devices. As is generally well known in the art, the memory may include various configurations comprising both volatile and non-volatile memory so that the necessity of magnetic or optical storage devices may be elminated. However, in the illustrated embodiment, the central electronic complex 120 interfaces with a storage device such as a magnetic disk drive 122, a display device such as a LCD 124 and a communication device such as a modem or network interface card 126. In a preferred embodiment, the central electronic complex 120 further interfaces with a GPS device 130 for obtaining positional information and special facility devices 132 and 134. By way of example, the special facility devices may include audio input/output for voice annotations, digital compass for obtaining directional information, inclinometers for orientation, digital cameras, bar code readers, or biometric readers for idnetifying authorized individuals.

A layer of device drivers 138–148 provide the interface between the real time operating system (RTOS) 136 and the central electronic complex 120. The use of drivers for such purposes is well known in the art and is not further discussed herein. RTOS 136 may be any commercially available operating system adapted for use in the portable environment.

Residing logically above the RTOS, is a layer of application program interfaces 150–160 which interface provide high level interface to the Native Methods layer 162. Interfaces 150–160 are also referred to as facilities because each interface may be customized to provide application specific capability. Native method layer 162 couples interfaces 150–160 to a Java virtual machine 164 so that application may be platform independent. At the application layer immediately above the Java virtual machine 164, various menus 166–176 are available for display by a users on the display device. As is well understood in the art, an appropriate selection by the user at display device is sufficient to select one of the menus for display. When a menu is selected, it and the related input forms 178 are displayed.

Selecting a particular menu and input, the user will be prompted to enter specific information responsive to menu queries. These responses are stored in data records 180–186 associated with each menu. Location and time information records 192–202 are appended to each data record to identify where the GPS coordinate that the data records 180–186 refer. Additional annotation information 204–214 may also be appended to data records 180–186 if required by a particular application.

Although the invention has been described herein with reference to a specific embodiment, many modifications and variations therein will readily occur to those skilled in the art. Accordingly, all such variations and modifications are included within the intended scope of the present invention as defined in the following claims.

APPENDIX 1

FULL FIELD ASSESSMENT REPORT

I. Transportation:
- A. Interstate / Major roads:
  - 1. Name
    - a. Interstate
    - b. US highway
    - c. State Road
    - d. County Road
    - e. Local Road
    - f. Other
  - 2. Road Number
  - 3. Location
  - 4. Damage
    - a. No damage
    - b. Damaged
      - 1. % Usable
  - 5. Traffic lanes affected by
    - a. Power Lines
    - b. Hazardous Materials
    - c. Traffic Signals
    - d. Fire
    - e. Debris
    - f. Highway lighting
    - g. Washouts/undermining
    - h. Abandoned/ Overturned vehicles
    - i. Overhead structures
- B. Bridges
  - 1. Name
  - 2. Location – Latitude/Longitude
  - 3. Damage
    - a. No Damage
    - b. Bridge Impacted by
      - 1. Roadway damage
      - 2. Structural Damage
      - 3. Flood Damage
      - 4. Bridge Collapsed
  - 4. Channel at Bridge affected
    - a. Debris in Channel
    - b. Channel Markers missing or inoperable
- C. Railroads
  - 1. Name
    - a. CSX
    - b. Southern
    - c. Georgia Pacific 2. Location - Latitude/Longitude
3. Damage
    a. No Damage
    b. Railroads affected by
        1. Trees downed/damaged
        2. Track mis-aligned
        3. Derailed Equipment
        4. Erosion/Flooding
        5. Hazardous materials D. Airports
    1. Name
    2. Location - Latitude/Longitude
    3. Damage
        a. No Damage
        b. Airport affected by
            1. Debris on Runway
            2. Approach lights down
            3. Control Tower damaged
            4. Debris on Helicopter -Pads
            5. Radar\Navigation systems inoperable
    4. Access Roads
        a. Impassible
        b. May be Flooded with in 72 hours
        c. Clear E. Seaports/Waterways
    1. Name
    2. Location - Latitude/Longitude
    3. Type of facility
        a. Cargo
        b. Passenger
        c. Military
        d. Petroleum
    4. Damage
        a. No damage
        b. Damage
            1. Seaport/Waterway impacted by
                a. Debris in Channel
                b. Inlet Obstructed
                c. Seaports Docks Damaged
                d. Navigation Aids damaged or inoperable
    5. Hazmat storage/products
        a. Yes
        b. No
    6. Access Roads - clear
        a. yes
        b. no II. Health and Medical
- A. Hospitals
  - 1. Name
  - 2. Location - Latitude/Longitude
  - 3. Status
    - a. Operational
    - b. Non-Operational
    - c. ER only
  - 4. Damage
    - a. No Damage
    - b. Hospital impacted by
      - 1. Power interruption
      - 2. Structural damage
      - 3. Flooding
      - 4. Access roads - clear
        - a. Primary
        - b. Secondary
      - 5. Helicopter -pad
        - a. Operational
        - b. Non-Operational
- B. Nursing Homes/Assisted Living
  - 1. Name
  - 2. Type
    - a. ALF
    - b. Rehab
    - c. Extended Care facility
  - 3. Location - Latitude/Longitude
  - 4. Occupancy
    - a. Occupied
    - b. Vacant
  - 5. Damage
    - a. No Damage
    - b. Impacted by
      - 1. Power interruption
      - 2. Structural damage
      - 3. Flooding
      - 4. Damage to access roads
- C. Other Care facilities
  - 1. Name
  - 2. Location - Latitude/Longitude
  - 3. Type
    - a. Walk in facility
    - b. County Health Clinic
  - 4. Damage
    - a. No damage
    - b. Damage 1. Power interruption
2. Structural damage
3. Flooding
4. Access roads D. Animal Care facilities
1. Name
2. Location - Latitude/Longitude
3. Type
a. Animal Shelter
b. Boarding facility
c. Vet/Kennel
d. Large Animal Care Facility
2. Damage
a. No Damage
b. Damage
1. Power interruption
2. Structural damage
3. Flooding
4. Access roads E. Emergency vehicles
1. Location
2 Fire fighting
a. Damaged (Number)
b. Destroyed (Number)
3. Medical
a. Damaged (Number)
b. Destroyed (Number)
4. Law Enforcement
a. Damaged (Number)
b. Destroyed (Number)

III. Housing
A. Single family
1. Site built
a. Location
b. Affected habitable (Number)
c. Uninhabitable (Number)
1. Minimal
2. Major
3. Destroyed
d. Flooding - Water to...
1. Bottom of door or below first floor level
2. Water to depth of first floor window
3. Water near or above entire first floor
2. Mobile home
a. Location
b. Affected habitable (Number)

c. Uninhabitable (Number)
1. Minimal
2. Major
3. Destroyed
d. Flooding
1.Home isolated, water level has not reached flooring (Skirt or Under support still visible)
2. Water above floor B. Multi-family
1. Townhouse/Condominium
a. Name
b. Location
c. Number of units
d. Number of Floors
1. Affected habitable (Number)
2. Uninhabitable (Number)
a. Minimal
b. Major
c. Destroyed
3. Flooding - Water to...
a. Bottom of door or below first floor level
b. Water to depth of first floor window
c. Water near or above entire first floor
2. Apartment
a. Name
b. Location
c. Number of units
d. Number of Floors
1. Affected habitable (Number)
2. Uninhabitable (Number)
a. Minimal
b. Major
c. Destroyed
3. Flooding - Water to...
a. Bottom of door or below first floor level
b. Water to depth of first floor window
c. Water near or above entire first floor
3. Hotels \ Motels
a. Name
b. Location
c. Number of units
d. Number of Floors
1. Affected habitable (Number)
2. Uninhabitable (Number)
a. Minimal
b. Major c. Destroyed
3. Flooding - Water to...
a. Bottom of door or below first floor level
b. Water to depth of first floor window
c. Water near or above entire first floor IV. Public Safety Communications
A. Police Communications
1. Name
2. Location
3.Type of Structure
a. Headquarter Tower
b. Repeaters
c. Leased space
4. Damage
a. No damage
b. Damage
1. Structural
2. Water damage
3. Electrical
B. Fire Service Communications
1. Name
2. Location
3.Type of Structure
a. Headquarter Tower
b. Repeaters
c. Leased space
4. Damage
a. No damage
b. Damage
1. Structural
2. Water damage
3. Electrical
C. EMS Communications
1. Name
2. Location
3.Type of Structure
a. Headquarter Tower
b. Repeaters
c. Leased space
4. Damage
a. No damage
b. Damage
1. Structural
2. Water damage
3. Electrical
D. 911 Dispatch Communications 1. Name
2. Location
3.Type of Structure
    a. Headquarter Tower
    b. Repeaters
    c. Leased space
4. Damage
    a. No damage
    b. Damage
        1. Structural
        2. Water damage
        3. Electrical V. Public Service Communications A. Telephone Switches
1. Name
2. Location
3.Type of Structure
    a. Main Tower
    b. Repeaters or relay
    c. Leased space
4. Damage
    a. No damage
    b. Damage
        1. Structural
        2. Water damage
        3. Electrical B. Cell Telephone Towers
1. Name
2. Location
3 Damage
    a. No damage
    b. Damage
        1. Structural
        2. Water damage
        3. Electrical C. Line Damage
1. No Damage
2. Damage
    a. Poles down
    b. Lines down only D. Public radio stations
1. Name/ band ID
2. Location
3. Damage
    a. No damage
    b. Damage 1. Operating on back-up power only
2. Limited signal strength
3. Transfer tower damaged
4. Transfer tower destroyed E. Television Stations
1. Name/ band ID
2. Location
3. Damage
a. No damage
b. Damage
1. Operating on back-up power only
2. Limited signal strength
3. Transfer tower damaged
4. Transfer tower destroyed VI. Infrastructure
A. Electricity
1. Name
2. Location- Latitude/ Longitude
3. Type of Fuel
a. Oil
b. Coal
c. Slurry
d. Natural gas
e. Hydroelectric
f. Nuclear
4. Number of Generators
1. Power Generation point
a. Physical damage
1. Major repairs needed
2. Non-emergency repairs needed
3. Transmission/Transformer yard damaged
4. Transmission/Transformer yard damaged
b. Access
1. Heavy equipment required to clear
2. Portable equipment required to clear
c. Fuel storage
1. Breached
2. Damaged
3. Destroyed
4 Flooded
d. Inundation
1. Flooded
2. Water damage evident
2. Substation
a. Name
b. Location c. Physical damage
1. Major repairs needed
2. non-emergency repairs needed
d. Access
1. Heavy equipment required to clear
2. Portable equipment required to clear
e. Inundation
1. Flooded
2. Water damage evident
3. High Voltage Transmission Lines
a. Location
b. Tower Damaged
c. Tower Destroyed
d. Transmission Line down/tower undamaged
4. Power Lines on street
a. Street Name
b. % of Downed lines
1. 0 to 25
2.26 to 50
3. 51 to 75
4. 75 to 100

B. Natural Gas Pumping Station
1. Location
2. Type
a. Check station
b. valve
3. Physical damage
a. major repairs needed
b. non-emergency repairs needed
4. Access
a. Heavy equipment required to clear
b. Portable equipment required to clear
5. Inundation
a. Flooded
b. Water damage evident C. Landfills
1. Name
2. Location
3. Approved Waste Class
a. 1
b. 2
c. 3
d. 4
e. multiple
4. Physical damage
a. major repairs needed b. non-emergency repairs needed
5. Access
a. Heavy equipment required to clear
b. Portable equipment required to clear
6. Inundation
a. Flooded
b. Water damage evident
D. Public Water Wells
1. Name
2. Location
3. Physical damage
a. major repairs needed
b. non-emergency repairs needed
4. Access
a. Heavy equipment required
b. Portable equipment required
5. Inundation
a. Flooded
b. Water damage evident
6. Contamination
a. Bio contamination
b. Chemical contamination
E. Wastewater Plants/Sewage Treatment
1. Name
2. Location
3. Physical damage
a. major repairs needed
b. non-emergency repairs needed
4. Access
a. Heavy equipment required
b. Portable equipment required
5. Inundation
a. Flooded
b. Water damage evident
6. Contamination
a. Bio contamination
b. Chemical contamination
F. Lift Stations
1. Name
2. Location
3. Physical damage
a. major repairs needed
b. non-emergency repairs needed
4. Access
a. Heavy equipment required
b. Portable equipment required 5. Inundation
    a. Flooded
    b. Water damage evident
6. Contamination
    a. Bio contamination
    b. Chemical contamination G. Schools
1. Name
2. Location
3. Public/Private
4. Type
    a. Elementary
    b. Middle
    c. High
    d. Vocational Tech
    e. Community College
    f. University
5. Used as shelter
    a. Yes
    b. No
6. Physical damage
    a. major repairs needed
        1. Roof
        2. Windows
        3. Building/Structure
    b. non-emergency repairs needed
7. Power supply
    a. Interrupted with out generator
    b. Has power
    c. Has generator operating
        1. Less than one day supply of fuel
        2. More than one day supply of fuel
8. Inundation
    a. None
    b. Water in school
        1. Grounds flooded only
        2. Water entering building
        3. Water at door handles
        4. Water above door handles H. Correctional Facilities
1. Name
2. Location
3. Number of inmates
4. Type
    a. Federal
    b. State c. County/ Local
5. Level
a. Maximum
b. Medium
c. Minimum
d. Prison Camp
e. Work release
I. Public Facilities
1. Name
2. Location
3 .Type
a. Federal
1. Function
a. Administrative/Control
b. Agency office
c. Judicial
d Park
2. Impacted by
a. Power interruption
b. Structural damage
c. Flooding
d. Damage to access roads
b. State
1. Function
a. Administrative/Control
b. Agency office
c. Judicial
d Park
2. Impacted by
a. Power interruption
b. Structural damage
c. Flooding
d. Damage to access roads
c. County
1. Function
a. Administrative/Control
b. Agency office
c. Judicial
d Park
2. Impacted by
a. Power interruption
b. Structural damage
c. Flooding
d. Damage to access roads
d. Municipal
1. Function a. Administrative/Control
b. Agency office
c. Judicial
d. Park
2. Impacted by
a. Power interruption
b. Structural damage
c. Flooding
d. Damage to access road
J. Water control facilities (Dam, levy, Canals)
1. Name
2. Location
3. Function
4. Damage
a. No damage
b. Impacted by
a. Power interruption
b. Structural damage
c. Flooding
d. Damage to access road
VII. Natural Resources/Recreational
1. Beaches and Shores
a. Name
b. Location
c. Damage
1. No Damage
2. Impacted by
a. erosion
b. debris
3. Dunes
a. slightly eroded at base
b. Moderately eroded (impacts very evident)
c. Major damage (80% or more of dune missing)
2. Riverine flooding
a. Name
b. Location of report/ gauge
c. Flooding affecting homes or businesses
1. Yes
2. No
3. Lakes/Reservoirs
a. Name
b. Location of report/ gauge
c. Flooding affecting homes or businesses
1. Yes
2. No
4. Marina's a. Name
b. Location
c. Number of berths
d. Dry storage spaces
e. Permanent Residents
f. Damage
1. None
2. Hazmat
a. Leaking fuel
b. Leaking Bio-waste
3. Number of boats sunk
4. Number of boats damaged VII. HAZMAT (gas stations and other facilities)
1. Name
2. Location
3. Type (Placard number)
a. Storage
1. Explosive
2. Corrosive
3. Flammable
4. Biological
5. Radioactive
6. Petroleum/Natural Gas
b. Production
1. Explosive
2. Corrosive
3. Flammable
4. Biological
5. Radioactive
6. Petroleum/Natural Gas
c. Transmission Pipelines
1. Explosive
2. Corrosive
3. Flammable
4. Biological
5. Radioactive
6. Petroleum/Natural Gas
3. Amount
a. large
b. moderate
c. limited
4. Damage
a. No Damage
b. Damage
1. Storage breached and leaking
2. Intact but damaged 3. Operating on Back-up power only

APPENDIX 2

SPOT FIELD ASSESSMENT REPORT

1) Medical / Safety
    a) Medical emergency
        i) Number of casualties
        ii) Type of injury
            (1) Major trauma
            (2) Non-life threatening
            (3) Minor
    b) Fire
    c) Explosion
    d) Toxic material release
2) Transportation
    a) Road blocked
        i) Power Lines
        ii) Hazardous Materials
        iii) Traffic Signals
        iv) Fire
        v) Debris
        vi) Highway lighting
        vii) Washouts/undermining
        viii) Abandoned/ Overturned vehicles
        ix) Overhead structures
    b) Bridge damaged
        i) Roadway
        ii) Structure
        iii) Flood
        iv) Collapsed
    c) Railroad blocked
        i) Downed trees
        ii) Mis-aligned track
        iii) Derailed equipment
        iv) Erosion flooding
        v) Hazardous materials
3) Building damaged
    a) Type building
        i) Hospital
        ii) Business
        iii) School
        iv) Residence
        v) Hotel/Motel
        vi) Restaurant
        vii) Multi-family dwelling viii) Government
b) Extent of damage (use same criteria)
i) 0
ii) 1
iii) 2
iv) 3
v) 4
vi) 5
4) Electricity
a) High Voltage transmission lines
i) Tower damaged
ii) Tower destroyed
iii) Line down, tower undamaged
b) Power lines
i) Poles down
ii) Lines on street
iii) Both
5) Cell phone tower
a) Tower damaged
b) Tower destroyed

We claim:

1. A system for dynamically assessing field conditions over a specified geographic area, said system comprising:

a plurality of mobile field devices for transmitting space-time coordinates and field assessment information and for receiving task-specific and location-specific assignments;

a receiver for receiving field assessment information from one or more of said mobile field devices in response to a task-specific and location-specific assignment specified on said one or more mobile field devices, wherein said field assessment information is associated with space-time coordinates, and wherein said field assessment information and associated space-time coordinates are received over a communication link established over either a land-based communication system or a satellite-based communication system depending on the present availability of the land-based or satellite-based communication systems;

a processor, responsive to receiving the field assessment information and associated space-time coordinates from said one or more mobile field devices, for assigning to said plurality of mobile field devices a next task-specific and location-specific assignment in accordance with the received field assessment information and associated space-time coordinates; and a transmitter for transmitting said next task-specific and location-specific assignment to said plurality of mobile field devices utilizing the communication link over which the field assessment information and associated space-time coordinates were received.

2. The system of claim 1, further comprising means for generating a map overlay that integrates the field assessment information and space-time coordinates with a summary report.

3. The system of claim 2, further comprising means for allocating resources within said specified geographic region in accordance with said map overlay and summary report.

4. The system of claim 1, wherein each of said one or more mobile field devices includes means for collecting said field assessment information by:

displaying a plurality of specific queries prompting a user for specific field assessment information;

inputting and storing said field assessment information in a storage device; and appending said field assessment information to an email message.

5. A system for dynamically coordinating field condition assessments over a specified geographic area, said system comprising:

means for collecting field assessment information at a specified location in accordance with a task-specific field assessment form;

means for appending the longitude and latitude corresponding to the location of the mobile field device from which said field assessment information was collected;

means for establishing a communication link for transmitting the field assessment information to an emergency management center using a land-based communication system, or if said land-based communication system is unavailable, a satellite communication system;

transmitters for transmitting said field assessment information to said emergency management center; and a processor, responsive to the emergency management center receiving the transmitted field assessment information, for:

parsing the field assessment information;

updating a field assessment report in accordance with the parsed field assessment information;

generating a map overlay displaying the parsed field assessment information as relating to a specific location within said specified geographic area;

delivering a next assignment to one or more of said plurality of mobile field devices in accordance with the updated field assessment report, wherein said next assignment specifies a next location to which the mobile field device is directed or a next field assessment form to be utilized to collect field assessment information; and transmitting said next assignment to one or more of said plurality of mobile field devices over the communication link corresponding to the communication link over which the transmitted field assessment information was received.

6. The system of claim 5, further comprising means for allocating resources to locations within said specified geographic area in accordance with said updated field assessment report.

7. The system of claim 5, wherein said means for collecting field assessment information comprises a mobile field device having a task-specific field assessment form for entering said field assessment information.

8. The system of claim 7, further comprising:

means for selecting a series of queries from the task-specific field assessment form, wherein said series of queries prompts a mobile field device user to enter specified field assessment information;

a user input device for entering field assessment information into said mobile field device;

a storage device resident on said mobile field device for retaining said field assessment information; and means for appending said field assessment information to an email message.

9. The system of claim 7, wherein said means for collecting field assessment information further comprises a digital compass.

10. The system of claim 7, wherein said means for collecting field assessment information further comprises an inclinometer.

11. The system of claim 7, wherein said means for collecting field assessment information further comprises a bar code reader.

* * * * *